(No Model.)
J. M. R. GEDNEY.
NUT LOCK.
No. 417,417. Patented Dec. 17, 1889.
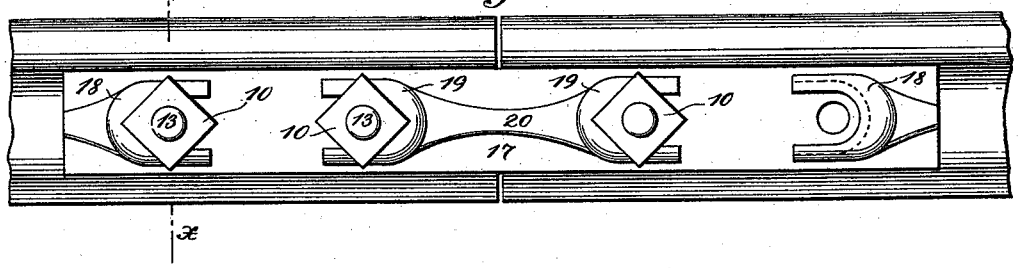
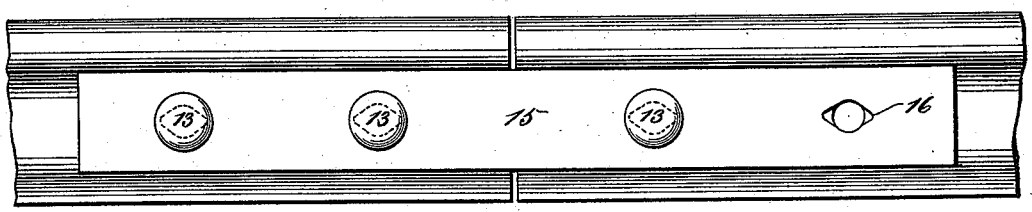
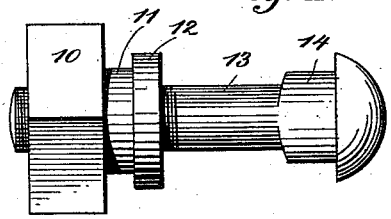
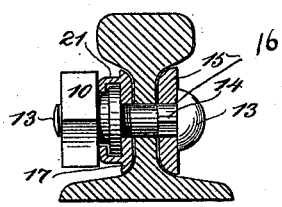
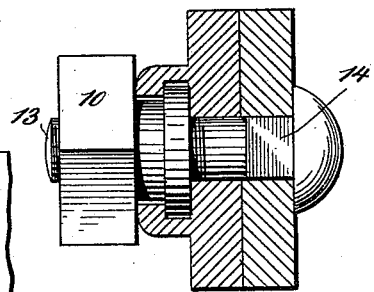
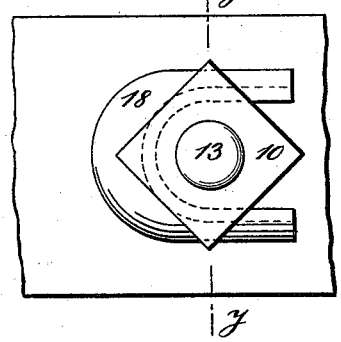
WITNESSES:
D. C. Reusch
C. Sedgwick
INVENTOR
J. M. R. Gedney
BY Munn & Co.
ATTORNEY

UNITED STATES PATENT OFFICE.

JACOB M. R. GEDNEY, OF LITTLE FALLS, NEW JERSEY.

NUT-LOCK.

SPECIFICATION forming part of Letters Patent No. 417,417, dated December 17, 1889.

Application filed March 20, 1889. Serial No. 303,945. (No model.)

*To all whom it may concern:*

Be it known that I, JACOB M. R. GEDNEY, M. D., of Little Falls, in the county of Passaic and State of New Jersey, have invented a new and Improved Nut-Lock, of which the following is a full, clear, and exact description.

The object of my invention is to provide a cheap, durable, and efficient nut-lock, and one that shall be applicable for use in connection with rail-joints, or which may be used in any place where the nuts are liable to become loosened, owing to constant jar or shock.

To the end named the invention consists, essentially, of a washer formed with a boss or projection having an undercut groove adapted to receive a head formed upon a shank that is made integral with the nut, the bolt being formed with a squared or irregularly-shaped shoulder, all as will be hereinafter more fully explained, and specifically pointed out in the claims.

Reference is to be had to the accompanying drawings, forming a part of this specification, in which similar figures of reference indicate corresponding parts in all the views.

Figure 1 is a side view of my improved nut-lock, the parts being represented as they appear when arranged in connection with a rail-joint. Fig. 2 is a view of the opposite side of the joint shown in Fig. 1. Fig. 3 is a cross sectional view taken on line *x x* of Fig. 1. Fig. 4 is an enlarged detail view of the nut and bolt. Fig. 5 is a face view of the lock as it appears when arranged for general use, and Fig. 6 is a sectional view on line *y y* of Fig. 5.

In carrying out my invention I provide a nut 10, formed with a shank 11, having an extending head or flange 12, this nut being threaded so as to engage with a bolt 13, which has a square or irregular section 14. If the lock is to be employed in connection with a rail-joint, I provide the usual wrought-iron fish-plate 15, formed with apertures 16, of proper shape to receive the bolt-section 14 and hold the bolt from turning when the section 14 is within the recess or aperture 16. Upon the opposite side of the rail-webs I place a fish-plate 17, preferably cast to the required shape, and formed with bosses or projections 18 and 19, the bosses 19 being connected by a strengthening-flange 20. All of the bosses formed upon the plate 17 have undercut recesses 21, of proper shape to receive the nut head or flange 12.

In operation the bolts are passed through the apertures in the plate 15 and through the usual apertures formed in the rail-webs, and the nuts are placed so that their heads or flanges rest within the undercut recesses of the projections formed, as before set forth, upon the plate 17. Then, if the bolts be forced forward and the nuts 10 turned, the threads of the nuts and bolts will engage, and any continued turning of the nuts will bring the bolts home, so that their heads will bear against the plate 15, in which position the parts will be securely held against accidental displacement, owing to the jarring produced by the passage of the trains.

In Figs. 5 and 6 I show the lock as it appears when arranged to join the parts of any machine, one of such machine parts being formed with a projection such as the one shown at 18 in the first two figures of the drawings, and in this case it would probably be preferable to employ a bolt 13, wherein the section 14 was square, as is shown in Fig. 6.

This lock is exceeding simple, and in practice will be found to operate in a manner that will be entirely satisfactory.

Having thus described my invention, I claim as new and desire to secure by Letters Patent—

1. The combination, with a nut formed with a headed or flanged shank, of a washer having an undercut groove or recess adapted to receive the headed shank of the nut, and a bolt arranged to engage the nut, substantially as described.

2. The combination, with a fish-plate formed with projections 18 and 19, the projections 19 being united by a strengthening-flange 20, and all of the projections being formed with undercut grooves or recesses, of nuts having headed or flanged shanks adapted to fit within the grooves or recesses of the plate projections, and bolts formed with irregular sections, said bolts being adapted to engage the nuts, substantially as described.

JACOB M. R. GEDNEY.

Witnesses:
F. W. HAWTHORNE,
A. COPELAND.